United States Patent [19]

Swayze

[11] Patent Number: 5,107,287
[45] Date of Patent: Apr. 21, 1992

[54] PHOTOGRAPHIC CAMERA WITH COVER/HANDLE

[75] Inventor: Samuel F. Swayze, Fairport, N.Y.

[73] Assignee: Eastman Kodak Company, Rochester, N.Y.

[21] Appl. No.: 637,852

[22] Filed: Jan. 7, 1991

[51] Int. Cl.[5] .......................................... G03B 29/00
[52] U.S. Cl. .................. 354/82; 354/149.11; 354/288
[58] Field of Search .............. 354/81, 82, 288, 149.11, 354/187; 352/243

[56] References Cited

U.S. PATENT DOCUMENTS

| | | | |
|---|---|---|---|
| 3,242,840 | 3/1966 | Kremp et al. | 352/243 |
| 3,256,793 | 6/1966 | Denk et al. | 354/288 |
| 3,588,239 | 6/1971 | Hochstein et al. | 352/243 |
| 4,075,642 | 2/1978 | Niggeloh | 354/82 |
| 4,097,133 | 6/1978 | Stemme et al. | 352/243 |
| 4,451,130 | 5/1984 | Yan | 354/82 |
| 4,493,542 | 1/1985 | Ohmura et al. | 354/82 |
| 4,575,206 | 3/1986 | Maeda et al. | 354/82 |
| 4,582,410 | 4/1986 | Niwaya et al. | 354/293 |
| 4,600,284 | 7/1986 | Kondoh et al. | 354/82 |

Primary Examiner—L. T. Hix
Assistant Examiner—David M. Gray
Attorney, Agent, or Firm—Roger A. Fields

[57] ABSTRACT

A photographic camera includes a camera body and a cover/handle coupled together for limited sliding movement of the cover/handle along the camera body to project increasingly from one end of the camera body to uncover the camera body and, when projected from the one end the extent it can be projected, for limited pivotal movement of the cover/handle about the one end to permit the cover/handle to be manually grasped erect to hold the camera body steady in a horizontal orientation for picture-taking. According to the invention, the cover/handle is fixed releasably to the camera body when the cover/handle is slid to project from the one end of the camera body only a portion of the extent it can be projected. This permits the cover/handle to be manually grasped erect to hold the camera body steady in a vertical orientation for picture-taking.

7 Claims, 5 Drawing Sheets

PHOTOGRAPHIC CAMERA WITH COVER/HANDLE

BACKGROUND OF THE INVENTION

1. Field of the Invention

The invention relates generally to the field of photography, and in particular to a photographic camera with a cover/handle.

2. Description of the Prior Art

Prior art U.S. Pat. No. 4,075,642, issued Feb. 21, 1978, discloses in FIG. 6 of the drawings a photographic camera including a camera body and a cover/handle coupled together for limited sliding movement of the cover/handle along the camera body to project increasingly from one end of the camera body to uncover the camera body. When the cover/handle is projected from the one end of the camera body the extent it can be projected, it is pivoted approximately 90° about the one end to permit the cover/handle to be manually grasped erect to hold the camera body steady in a horizontal orientation for picture-taking. No provision is suggested, however, for supporting the camera body in a vertical orientation for picture-taking. Thus, the cover/handle is limited in regard to use.

SUMMARY OF THE INVENTION

According to the invention, a photographic camera comprising a camera body and a cover/handle coupled together for limited sliding movement of the cover/handle along the camera body to project increasingly from one end of the camera body to uncover the camera body and, when projected from the one end the extent it can be projected, for limited pivotal movement of the cover/handle about the one end to permit the cover/handle to be manually grasped erect to hold the camera body steady in a horizontal orientation for picture-taking, is characterized in that:

mutual engagement means are located on the camera body and the cover/handle for fixing the cover/handle releasably to the camera body, when the cover/handle is slid to project from the one end only a portion of the extent it can be projected, to permit the cover/handle to be manually grasped erect to hold the camera body steady in a vertical orientation for picture-taking.

More specifically, the photographic camera includes an electronic flash unit biased to pop-up from the camera body. The cover/handle normally covers the flash unit to prevent the flash unit from popping up from the camera body, but is sized to uncover the flash unit to permit the flash unit to pop up from the camera body when the cover/handle is slid to project from the one end no more than the amount it must be projected from the one end for the engagement means to fix the cover/handle to the camera.

DETAILED DESCRIPTION OF THE PREFERRED EMBODIMENT OF THE INVENTION

The invention is disclosed as being embodied preferably in a conventional 35 mm still-picture camera including an electronic flash unit. Because the features of this type of camera are well known, the description which follows is directed in particular to elements forming part of or cooperating directly with the preferred embodiment. It is to be understood, however, that other elements not shown or described may take various forms known to persons of ordinary skill in the art.

Figure 1:
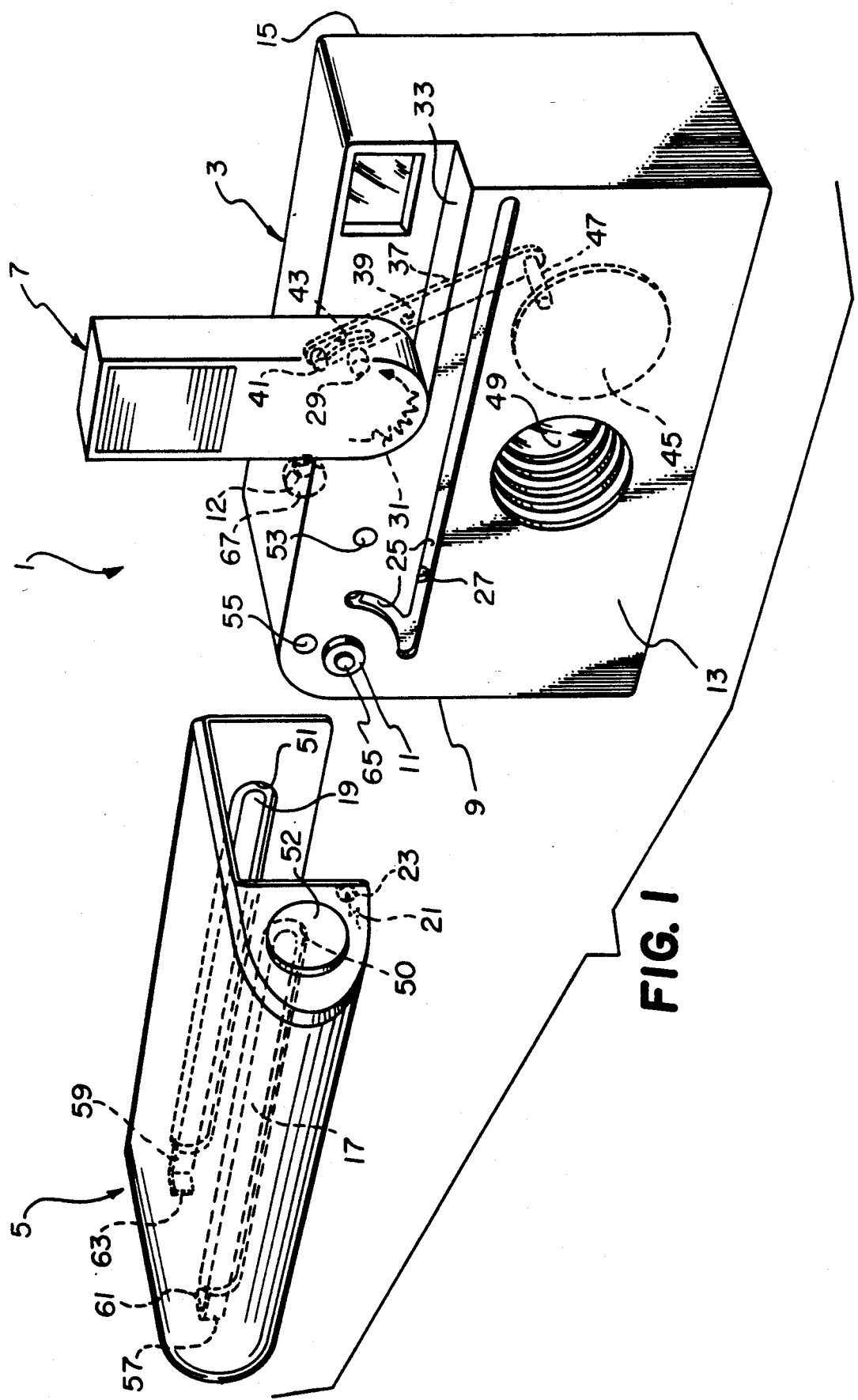
FIG. 1 is an exploded perspective view of a photographic camera with a cover/handle, according to a preferred embodiment of the invention.

Referring now to the drawings and in particular to FIG. 1, a 35 mm still-picture camera 1 is shown comprising a camera body 3, a cover/handle 5 and an electronic flash unit 7.

Figure 2:
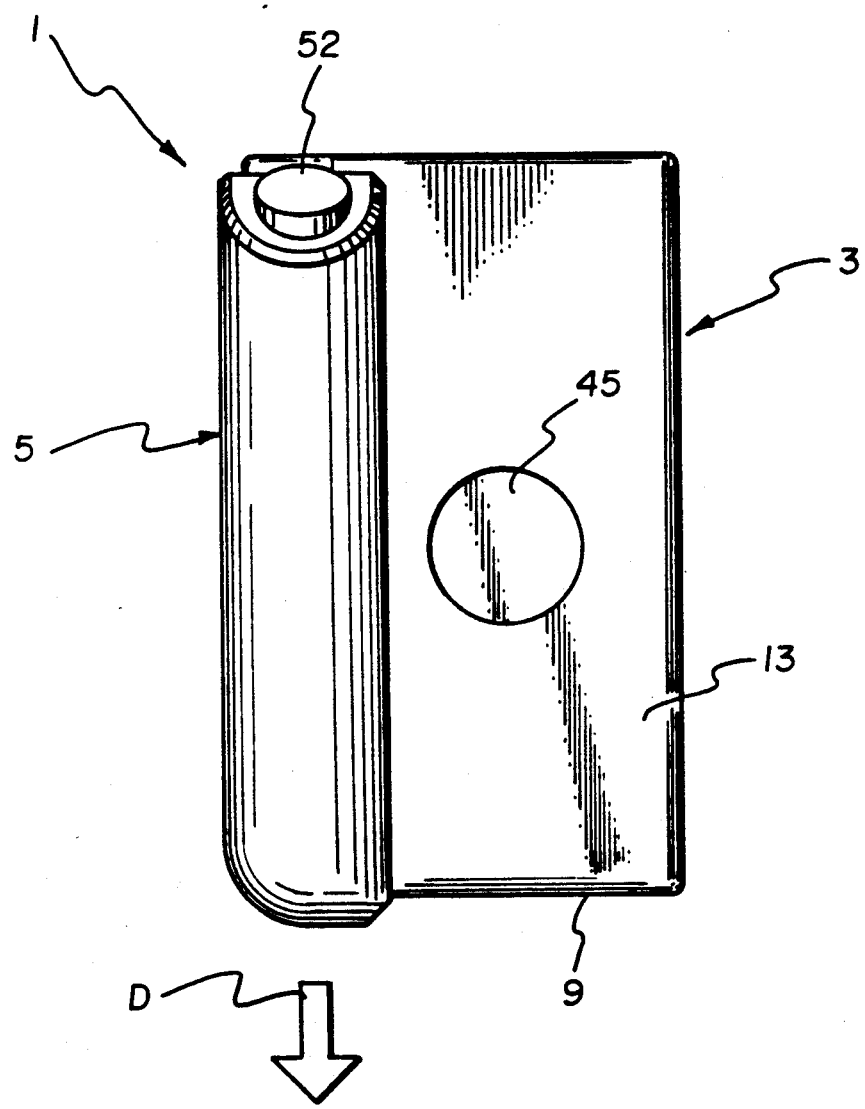
FIG. 2 is a front elevation view of the photographic camera in a vertical orientation for picture-taking, shown with the cover/handle overlying the camera body in a normal covering position.
Figure 3:
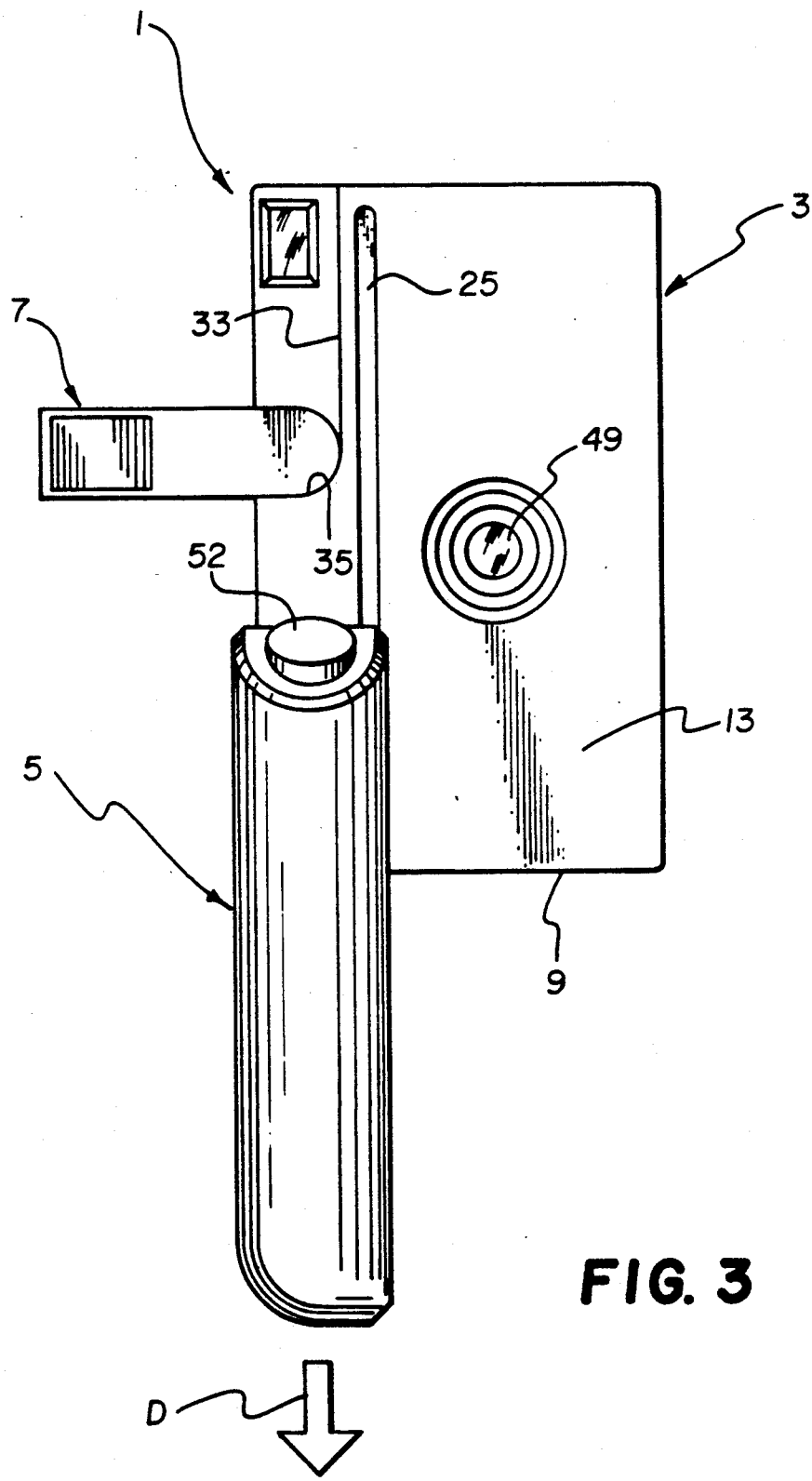
FIG. 3 is a front elevation view similar to FIG. 2, shown with the cover/handle extended from the camera body to a vertical support position.
Figure 4:
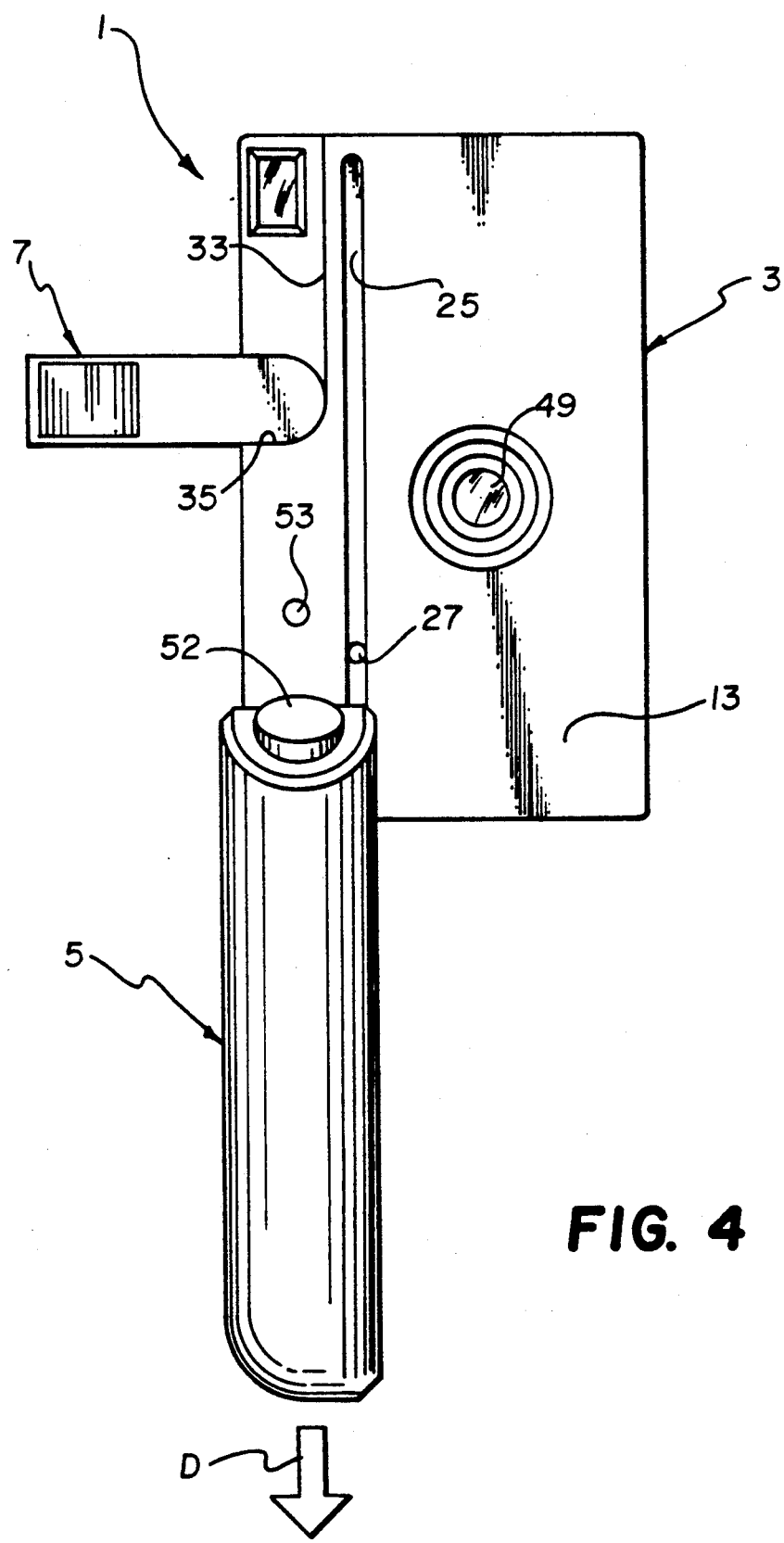
FIG. 4 is a front elevation view similar to FIG. 3, shown with the cover/handle further extended to a pivot-enabling position.

The camera body 3 and the cover/handle 1 are coupled together for limited sliding movement of the cover/handle along the camera body in the direction D to project increasingly from one end 9 of the camera body to uncover the camera body as shown in FIGS. 2-4. The specific means for coupling the camera body 3 and the cover/handle 5 together for such sliding movement includes respective in-line studs 11 and 12 that project from a front face 13 and a rear face 15 of the camera body into parallel channels 17 and 19 in the cover/handle 5. See FIG. 1. A compression spring 21 maintains a detent element 23 of the cover/handle 5 within a groove 25 in the front face 13 of the camera body 3 as the cover/handle 5 is slid along the camera body in the direction D. A cavity 27 in the groove 25 receives the detent element 23 to releasably retain the cover/handle 5 in a vertical support position shown in FIG. 3. When in the vertical support position, the cover/handle 5 has been slid along the camera body 3 to project from the one end 9 only a portion of the extent it can be projected, and it is able to be manually grasped erect to hold the camera body 3 steady in a vertical orientation for picture-taking.

The flash unit 7 is pivotally coupled to the camera body 3 via a pivot pin 29 and is biased by a torsion spring 31 to pop up out of a nest 33 in the camera body and against a stop wall 35 of the nest as shown in FIG. 1. The cover/handle 5 normally covers the flash unit 7 to hold it collapsed or folded in the nest 33. However, when the cover/handle 5 is slid along the camera body 3 in the direction D to the vertical support position shown in FIG. 3, it will have uncovered the flash unit 7 to permit the torsion spring 31 to pop up the flash unit against the stop wall 35. As the flash unit 7 is popped up toward the stop wall 35, a link bar 37 pivotally coupled to the camera body 3 via a pivot pin 39 is swung about the pivot pin due to the presence of a follower stud 41 of the link bar in an arcuate camming groove 43 in the flash unit. This action moves a lens cover 45 connected to the link bar 37 via an intermediate pin 47 from a covering position in front of a taking lens 49 as shown in FIG. 2 to a non-covering position removed from the lens as shown in FIG. 1. Although not shown, suitable known means may be provided for activating the camera electronics including the flash charging circuit responsive to the flash unit 7 popping up from the nest 33.

Figure 5:
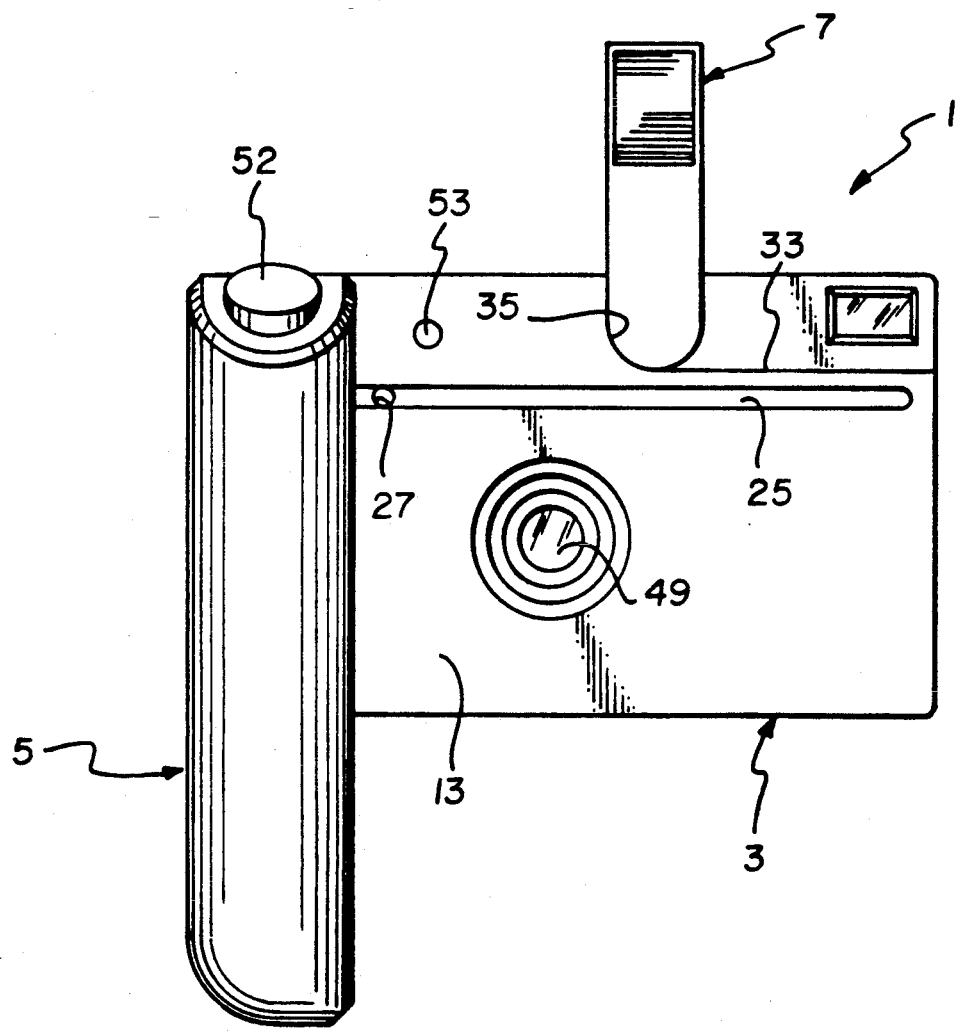
FIG. 5 is a front elevation view of the photographic camera in a horizontal orientation for picture-taking, shown with the cover/handle pivoted about the camera body to a horizontal support position.

When the cover/handle 5 is in the vertical support position shown in FIG. 3 and it is slid along the camera body 3 further in the direction D, first the detent element 23 will be forceably removed from the cavity 27 and then the in-line studs 11 and 12 will abut respective ends 50 and 51 of the two channels 17 and 19 to prevent continued movement of the cover/handle in the same direction. At this time, the cover/handle 5 will be in a pivot-enabling position shown in FIG. 4 which permits the camera body 3 to be swung about the in-line studs 11 and 12 from the vertical orientation for picture-taking as shown in FIG. 3 to a horizontal orientation for picture-taking as shown in FIG. 5. When the camera body 3 is in the horizontal orientation shown in FIG. 5, the one end 9 of the camera body rests against the cover/handle 5. Thus, the cover/handle 5 is in a horizontal support position, permitting the cover/handle to be manually grasped to hold the camera body 3 steady in the horizontal orientation.

As shown in FIG. 1, the cover/handle 5 includes a manually depressible shutter release button 52 which, when depressed, can alternatively actuate either one of two actuatable members 53 and 55 substantially flush with the front face 13 of the camera body 3, in order to actuate a camera shutter (not shown). Specifically, when the cover/handle 5 is in the vertically support position shown in FIG. 3, the shutter release button 52 will be aligned with the actuatable member 53 to actuate that member and, when the cover/handle is in the horizontal support position shown in FIG. 5, the shutter release button will be aligned with the actuatable member 55 to actuate that member.

The cover/handle 5 includes two electrically conductive strips or ribbons 57 and 59 extending longitudinally within the respective channels 17 and 19 and having opposite ends 61 and 63 located outside the channels. See FIG. 1. The two ends 61 and 63 are spaced apart to electrically contact the positive and negative terminals of a battery (not shown) placed between the two ends. Respective exposed contact pins 65 and 67 are embedded in the in-line studs 11 and 12 to make electrical contact with the battery to power the flash unit 7, when the cover/handle 5 is in the vertical orientation shown in FIG. 3 or the horizontal orientation shown in FIG. 5.

The invention has been described with reference to a preferred embodiment. However, it will be appreciated that various modifications can be effected within the ordinary skill in the art.

I claim:

1. A photographic camera comprising a camera body and a cover/handle coupled together for limited sliding movement of said cover/handle along said camera body to project increasingly from one end of the camera body to uncover the camera body and, when projected from said one end the extent it can be projected, for limited pivotal movement of the cover/handle about the one end to permit the cover/handle to be manually grasped erect to hold the camera body steady in a horizontal orientation for picture-taking, is characterized in that:

mutual engagement means are located on said camera body and said cover/handle for fixing the cover/handle releasably to the camera body, when the cover/handle is slid to project from said one end only a portion of the extent it can be projected, to permit the cover/handle to be manually grasped erect to hold the camera body steady in a vertical orientation for picture-taking.

2. A photographic camera as recited in claim 1, wherein an electronic flash unit is biased to pop-up from said camera body, and said cover/handle normally covers said flash unit to prevent the flash unit from popping up from said camera body but is sized to uncover the flash unit to permit the flash unit to pop up from the camera body when the cover/handle is slid to project from said one end no more than said portion it must be projected from the one end for said engagement means to fix the cover/handle to the camera body.

3. A photographic camera as recited in claim 1, wherein said cover/handle includes a manually depressible button, and said camera body includes respective means actuatable alternatively in response to manual depression of said button when said cover/handle projects from said one end said portion it must be projected from the one end for said engagement means to fix the cover/handle to the camera body or when the cover/handle is pivoted about said one end.

4. A photographic camera comprising a camera body, and a pop-up flash unit biased to pop up from said camera body, is characterized in that:

cover means normally covers said electronic flash unit to prevent the flash unit from popping up from said camera body; and cooperating means couples said camera body and said cover means for sliding movement of the cover means along the camera body to uncover the flash unit to permit the flash unit to pop up from the camera body.

5. A photographic camera as recited in claim 4, wherein said cover means is sized to project increasingly from said camera body as the cover means is slid along the camera body to uncover said flash unit to permit the cover means to serve as a handle that may be manually grasped to hold the camera body steady when the cover means has uncovered the flash unit.

6. A photographic camera as recited in claim 4, wherein said coupling means includes integral means for allowing said cover means to continue to side along said camera body after the cover means has uncovered said flash unit to permit the cover means to project from the camera body to serve as a handle that may be manually grasped to hold the camera body steady.

7. A photographic camera as recited in claim 6, wherein mutual limit means are located on said camera body and said cover means for limiting the amount the cover means can be slid to project from the camera body, mutual engagement means are located on said camera body and said cover means for fixing the cover means releasably to the camera body when the cover means is projected from the camera body only a portion of the extent it can be projected, and pivot means are located on said camera body and said cover means for allowing the cover means to pivot about the camera body when the cover means is projected from the camera body the extent it can be projected.

* * * * *